United States Patent
Obata et al.

(10) Patent No.: US 9,991,760 B2
(45) Date of Patent: Jun. 5, 2018

(54) DRIVE DEVICE FOR VEHICLE

(75) Inventors: Tatsuo Obata, Toyota (JP); Kunio Morisawa, Toyota (JP); Tsuyoshi Kitahata, Toyota (JP); Takeshi Kuwahara, Nisshin (JP); Hiromichi Kimura, Toyota (JP); Masahiro Tanae, Okazaki (JP); Toru Saitou, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days. days.

(21) Appl. No.: 14/233,222

(22) PCT Filed: Jul. 19, 2011

(86) PCT No.: PCT/JP2011/066387
§ 371 (c)(1),
(2), (4) Date: Apr. 2, 2014

(87) PCT Pub. No.: WO2013/011567
PCT Pub. Date: Jan. 24, 2013

(65) Prior Publication Data
US 2014/0285045 A1    Sep. 25, 2014

(51) Int. Cl.
*H02K 7/00* (2006.01)
*H02K 7/116* (2006.01)
(Continued)

(52) U.S. Cl.
CPC ............ *H02K 7/006* (2013.01); *H02K 7/116* (2013.01); *H02K 15/16* (2013.01); *H02K 16/00* (2013.01)

(58) Field of Classification Search
CPC ........ H02K 7/006; H02K 7/116; H02K 15/16; H02K 16/00
(Continued)

(56) References Cited

U.S. PATENT DOCUMENTS

| | | | |
|---|---|---|---|
| 1,359,616 A | * | 11/1920 Murray | ............... F16H 61/0202 310/105 |
| 3,897,843 A | * | 8/1975 Hapeman | ............... B60K 17/14 105/53 |

(Continued)

FOREIGN PATENT DOCUMENTS

| CN | 101111984 A | 1/2008 |
|---|---|---|
| EP | 0 587 389 | 3/1994 |

(Continued)

*Primary Examiner* — John K Kim
(74) *Attorney, Agent, or Firm* — Finnegan, Henderson, Farabow, Garrett & Dunner, LLP

(57) ABSTRACT

A vehicular drive system is provided with at least one electric motor and a helical gear portion which are accommodated within a casing formed by a plurality of casing members fixed to each other, wherein: said casing includes a first casing member to which a stator of each of said at least one electric motor is fixed, and a second casing member which is fixed to said first casing member so as to cooperate with said first casing member to form a space accommodating said at least one electric motor and which has a support portion supporting said helical gear portion; and a rotor of said each electric motor is rotatably supported at opposite ends thereof by said first casing member and said second casing member, respectively, while said helical gear portion is rotatably supported by said second casing member through said support portion.

14 Claims, 6 Drawing Sheets

(51) Int. Cl.
*H02K 15/16* (2006.01)
*H02K 16/00* (2006.01)

(58) Field of Classification Search
USPC .................................. 310/68 R, 83, 99, 89
IPC .............................................. H02K 7/00,7/116
See application file for complete search history.

(56) References Cited

U.S. PATENT DOCUMENTS

| | | | | |
|---|---|---|---|---|
| 6,133,659 | A * | 10/2000 | Rao | B60K 6/105 |
| | | | | 123/3 |
| 6,139,298 | A * | 10/2000 | Kojima | F04C 29/0071 |
| | | | | 310/216.122 |
| 6,896,080 | B2 * | 5/2005 | Takenaka | B60K 6/36 |
| | | | | 180/65.235 |
| 6,952,061 | B2 * | 10/2005 | Mogi | H02K 5/1732 |
| | | | | 310/75 R |
| 7,453,179 | B2 * | 11/2008 | Innami | B62D 5/0403 |
| | | | | 310/216.137 |
| 7,641,457 | B2 * | 1/2010 | Asai | F01C 21/02 |
| | | | | 310/40 R |
| 7,811,190 | B2 * | 10/2010 | Tabata | B60K 6/26 |
| | | | | 475/5 |
| 7,828,095 | B2 * | 11/2010 | Murata | B60K 7/0007 |
| | | | | 180/65.1 |
| 2003/0196842 | A1 * | 10/2003 | Hashimoto | B60K 1/00 |
| | | | | 180/65.1 |
| 2003/0230945 | A1 * | 12/2003 | Okubo | B62D 5/0403 |
| | | | | 310/112 |
| 2005/0116561 | A1 * | 6/2005 | Matsubara | B62D 5/0403 |
| | | | | 310/83 |
| 2005/0248230 | A1 * | 11/2005 | Kawasaki | H02K 1/148 |
| | | | | 310/216.001 |
| 2005/0253465 | A1 * | 11/2005 | Takenaka | H02K 5/20 |
| | | | | 310/52 |
| 2006/0022539 | A1 * | 2/2006 | Burgman | B60K 6/26 |
| | | | | 310/112 |
| 2007/0046121 | A1 * | 3/2007 | Miura | H02K 1/17 |
| | | | | 310/154.08 |
| 2008/0106163 | A1 * | 5/2008 | Mizuno | B60K 6/365 |
| | | | | 310/83 |
| 2009/0160274 | A1 * | 6/2009 | Aikawa | B60K 1/00 |
| | | | | 310/83 |
| 2009/0213564 | A1 | 8/2009 | Kakuda et al. | |
| 2010/0013329 | A1 * | 1/2010 | Heidenreich | H02K 9/19 |
| | | | | 310/54 |
| 2011/0036652 | A1 * | 2/2011 | Honda | B60K 6/36 |
| | | | | 180/65.25 |
| 2011/0050014 | A1 * | 3/2011 | Mogi | B60K 17/12 |
| | | | | 310/83 |
| 2011/0094806 | A1 * | 4/2011 | MacK | H02K 7/003 |
| | | | | 180/65.6 |
| 2014/0285045 | A1 * | 9/2014 | Obata | H02K 7/116 |
| | | | | 310/83 |

FOREIGN PATENT DOCUMENTS

| | | |
|---|---|---|
| JP | 2001-97058 | 4/2001 |
| JP | 2004-312960 | 11/2004 |
| JP | 2004-353780 | 12/2004 |
| JP | 2009-201257 | 9/2009 |
| JP | 2010-168914 | 8/2010 |
| JP | 2010-187460 | 8/2010 |

* cited by examiner

US 9,991,760 B2

DRIVE DEVICE FOR VEHICLE

CROSS-REFERENCE TO RELATED APPLICATIONS

This application is a national phase application of International Application No. PCT/JP2011/066387, filed Jul. 19, 2011, the content of which is incorporated herein by reference.

TECHNICAL FIELD

The present invention relates to an arrangement of a vehicular drive system which is provided with an electric motor accommodated within a casing, and which permits reduction of an operating noise and an operation performance of the electric motor.

BACKGROUND ART

There is well known a vehicular drive system which is provided with at least one electric motor and a helical gear portion which are accommodated within a casing consisting of a plurality of casing members fixed to each other. Patent Documents 1 and 2 disclose examples of such a vehicular drive system in the form of a drive system control unit and a hybrid drive system, respectively. In the drive system control unit 1 of Patent Document 1, a drive system casing 60 consists of three casing members, and accommodates an electric generator G (electric motor) disposed on a first axis A1, an electric motor M disposed on a second axis A2, and a counter gear mechanism T serving as a helical gear portion disposed on a third axis, as shown in FIG. 4. In the hybrid drive system 10 of Patent Document 2, a first motor/generator 14 disposed on a first axis O1, a second motor/generator 18, and a power distributing mechanism 16 serving as a helical gear portion are accommodated within a casing consisting of three casing members in the form of a second motor housing 56, a first motor housing 64 and a motor cover 66, as shown in FIG. 1.

PRIOR ART DOCUMENTS

Patent Documents

Patent Document 1: JP-2009-201257 A
Patent Document 2: JP-2001-97058 A

SUMMARY OF THE INVENTION

Object Achieved by the Invention

By the way, the drive system control unit 1 of Patent Document 1 is arranged such that the casing member to which stators of the electric generator G and the electric motor M are fixed is provided with a support portion which supports the counter gear mechanism T serving as the helical gear portion, as shown in FIG. 4. In the vehicular drive system arranged as described above, a meshing reaction force generated by the counter gear mechanism T is transmitted to the casing member through the support portion, so that the casing member is deformed by the meshing reaction force, with a result of a variation of the positions at which the stators of the electric generator G and electric motor M are fixed to the casing member. Accordingly, operating noises of the electric generator G and electric motor M are increased due to a variation of an amount of a gap (air gap) formed between the stator and a rotor of each of the electric generator G and electric motor M. On the other hand, the amounts of the air gaps are required to be set large enough to avoid sliding contacts of the stators and rotors with each other due to the variation of the fixing positions of the stators. However, this setting of the air gaps results in reduction of the operation performance of the electric motors.

In the hybrid drive system 10 of Patent Document 2, a stator of the second motor/generator 18, the power distributing mechanism 16 and a counter shaft 30 provided with helical gears are all supported commonly by the second motor housing 56. Further, a stator of the first motor/generator 14 is supported by the first motor housing 64, while the counter shaft 30 and the power distributing mechanism 16 are supported by the first motor housing via a motor support 54. Accordingly, loads acting on the counter shaft 30 and power distributing mechanism 16 are transmitted to the first motor housing 64 through the motor support 54. In this respect, it is noted that the motor support 54 cooperates with the first motor housing 64 to constitute a housing of the first motor/generator 14, and is therefore substantially considered to be a part of the first motor housing 64. Thus, air gaps of the first motor/generator 14 and second motor/generator 18 of Patent Document 2 also vary, tending to reduce the operating noises and operation performances of the electric motors. Although the rigidity of the casing may be increased by providing the casing with ribs, the provision of the ribs results in an increase of the weight of the drive system together with an increase of its size, giving rise to problems of deterioration of fuel economy and an increase of a cost of manufacture of the drive system.

The present invention was made in view of the background art described above. It is therefore an object of the present invention to provide a vehicular drive system which is provided with at least one electric motor and a helical gear portion which are accommodated within a casing consisting of a plurality of casing members, and which permits reduction of an amount of variation of the fixing position of the stator of each electric motor due to the meshing reaction force generated by the helical gear portion, to thereby prevent the deterioration of the operating noise and operation performance of the electric motor due to a variation of its air gap.

Means for Achieving the Object

The object indicated above is achieved according to the present invention as defined in the first aspect of the invention, which provides (a) a vehicular drive system which is provided with at least one electric motor and a helical gear portion which are accommodated within a casing formed by a plurality of casing members fixed to each other, characterized in that (b) the above-described casing includes a first casing member to which a stator of each of the above-described at least one electric motor is fixed, and a second casing member which is fixed to the above-described first casing member so as to form a space accommodating the above-described at least one electric motor and which has a support portion supporting the above-described helical gear portion, and (c) a rotor of the above-described each electric motor is rotatably supported at opposite ends thereof by the above-described first casing member and the above-described second casing member, respectively.

Advantages of the Invention

According to the invention described above, a meshing reaction force of the helical gear portion is transmitted to the second casing member, so that the first casing member to which the stator of each electric motor is fixed is substantially protected from an influence of the meshing reaction force. Accordingly, an amount of variation of a fixing position of the stator of the electric motor due to the meshing reaction force can be reduced, so that an operating noise of the electric motor due to a variation of its air gap can be reduced. Further, it is not necessary to increase an amount of the air gap for avoiding a sliding contact of the stator and rotor of the electric motor with each other, so that operation performance of the electric motor will not be reduced due to the otherwise increased amount of the air gap. In addition, the second casing member functions as not only the support member supporting the helical gear portion, but also the member forming the space accommodating the electric motor, eliminating a need of providing a member which is exclusively used to form the space accommodating the electric motor.

Preferably, an inverter is installed outside of the above-described casing such that the inverter is fixed to a casing member of the casing other than the above-described second casing member. Accordingly, the meshing reaction force generated by the helical gear portion is not substantially transmitted to the inverter, so that it is possible to reduce an amount of vibrations derived from the meshing reaction force, which amount is transmitted to the inverter.

MODE FOR CARRYING OUT THE INVENTION

Embodiment of the present invention will be described in detail by reference to the drawings. In the embodiments described below, the drawings are simplified or transformed as needed, and do not necessarily accurately represent the dimensions and shapes of various elements.

First Embodiment

Figure 1:
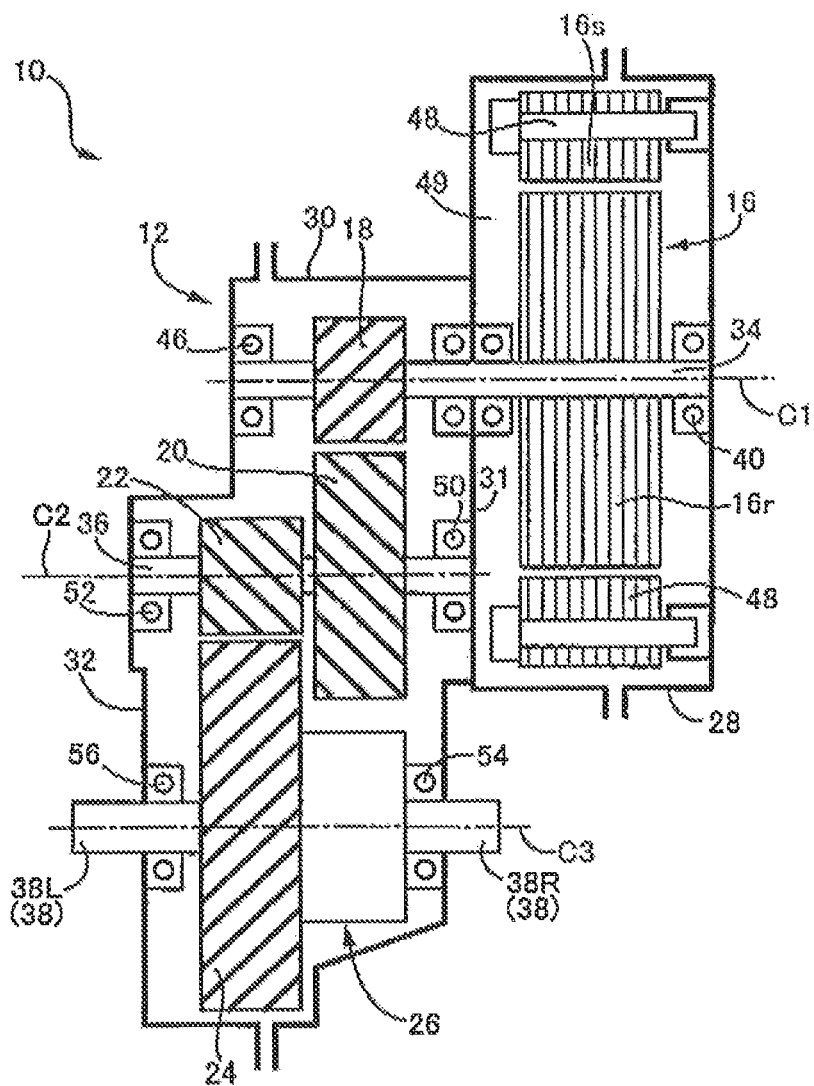
FIG. 1 is a schematic view for explaining an arrangement of a vehicular drive system according to one embodiment of this invention.

FIG. 1 is the schematic view for explaining an arrangement of a vehicular drive system 10 according to one embodiment of this invention. The vehicular drive system 10 is provided with major components accommodated in a casing 12, which include: an electric motor 16 and a counter drive gear 18 disposed on a first axis C1; a counter driven gear 20 and a final drive gear 22 disposed on a second axis C2; and a differential mechanism 26 which is disposed on a third axis C3, to receive an input rotary motion from a final driven gear 24. It is noted that the counter driven gear 20 and the final drive gear 22 correspond to a helical gear portion provided according to the present invention.

The casing 12 is constituted by three casing members consisting of a cylindrical first casing member 28 having a bottom wall, a cylindrical second casing member 30 having a partition wall 31, and a cylindrical third casing member 32 having a bottom wall. The first casing member 28 and the second casing member 30 are fixed to each other with bolts not shown such that a butting surface of the first casing member 28 located at its open axial end and a butting surface of the second casing member 30 located at its axial end on the side of the open axial end of the first casing member 28 are held in tight contact with each other, while the second casing member 30 and the third casing member 32 are fixed to each other with bolts not shown, such that a butting surface of the second casing member 30 located at its axial end on the side of the third casing member 32 and a butting surface of the third casing member 32 located at its open axial end are held in tight contact with each other. It is noted that the first casing member 28 corresponds to a first casing member provided according to the invention, while the second and third casing members 30 and 32 correspond to a second casing member provided according to the invention.

The casing 12 accommodates an input shaft 34 disposed rotatably on the first axis C1, a counter shaft 36 disposed rotatably on the second axis C2, and drive shafts 38 disposed rotatably on the third axis C3.

The input shaft 34 is rotatably supported at its one axial end portion by the first casing member 28 via a bearing 40, and at its other axial end portion by the third casing member 32 via a bearing 46. To this input shaft 34, there are fixed a rotor 16r of the electric motor 16 and the counter drive gear 18 such that the rotor 16r and the counter drive gear 18 are arranged in series with each other in the axial direction. The electric motor 16 has a stator 16s fixed to the first casing member 28 with a plurality of bolts 48 which are spaced apart from each other in the circumferential direction of the first casing member 28.

The electric motor 16 is accommodated within a space 49 formed by the first and second casing members 28 and 30 fixed to each other. The rotor 16r of this electric motor 16 is rotatably supported at its opposite axial end portions by the respective first and second casing members 28 and 30. Namely, the second casing member 30 also functions as a motor cover which rotatably supports the rotor 16r of the electric motor 16 at its one axial end portion.

The counter shaft 36 is rotatably supported at its one axial end portion by the second casing member 30 (partition wall 31) via a bearing 50, and at its other axial end portion by the third casing member 32 via a bearing 52. To this counter shaft 36, there are fixed the counter driven gear 20 meshing with the counter drive gear 18, and the final drive gear 22 having a diameter smaller than that of the counter driven gear 20, such that the counter driven gear 20 and the final drive gear 22 are arranged in series with each other in the axial direction. These counter driven gear 20 and final drive gear 22 function as a speed reducing gear mechanism. It is noted that the counter shaft 36, bearing 50 and bearing 52 constitute a support portion which is provided according to this invention to support the helical gear portion.

The drive shafts 38 correspond to a pair of right and left drive shafts 38R and 38L of the differential mechanism 26 (differential gear device). The drive shaft 38R is rotatably supported by the second casing member 30 via a bearing 54, while the drive shaft 38L is rotatably supported by the third casing member 32 via a bearing 56. The differential mechanism 26 is disposed on the third axis C3, to transmit the rotary motion received from the final driven gear 24 to the left and right drive shafts 38L and 38R, so as to permit a difference between rotating speeds of those drive shafts 38L, 38R according to a running state of a vehicle.

Each of the counter drive gear 18 in this embodiment, counter driven gear 20, final drive gear 22 and final driven gear 24 is a helical gear. The counter driven gear 20 and final drive gear 22 are fixedly mounted on the counter shaft 36, so that meshing reaction forces generated by meshing engagements of the counter driven gear 20 and final drive gear 22 with the respective mating gears are transmitted to the counter shaft 36, and to the second and third casing members 30 and 32 through the bearings 50 and 52. On the other hand, the first casing member 28 is fixed to the second casing member 30 with bolts not shown, at their butting surfaces. In this respect, it is noted that the portions of the casing members provided with the butting surfaces take the form of flanges having higher degrees of rigidity, so that a local displacement (deformation) of the second casing member 30 due to the meshing reaction force is not substantially transmitted to the first casing member 28 via the butting surfaces.

In the present embodiment, the stator 16s of the electric motor 16 is fixed to the first casing member 28. Since the stator 16s is thus fixed to the first casing member 28 rather than to the second and third casing members (30, 32) to which the above-indicated meshing reaction forces are transmitted, an almost entirety of the meshing reaction force generated on the counter shaft 36 is transmitted to the second and third casing members 30 and 32, so that substantially no local displacement of the first casing member 28 takes place due to the meshing reaction force. The first casing member 28 is hardly subjected to deformation due to the meshing reaction forces and a fixing position at which the stator 16s of the electric motor 16 is fixed is hardly moved due to the meshing reaction forces. Accordingly, there arises substantially no variation of an amount of an air gap between the stator 16s and rotor 16r of the electric motor 16, and an operating noise of the electric motor 16 due to the variation of the amount of the air gap is reduced. Further, it is not necessary to increase the amount of the air gap for avoiding sliding contact of the stator 16s and rotor 16r of the electric motor 16 with each other, so that an operation performance of the electric motor will not be reduced.

Further, the first casing member 28 to which the stator 16s of the electric motor 16 is fixed takes the form of a flange only at its open axial end having the butting surface held in abutting contact with the second casing member 30, and has an outside diameter which decreases in the axial direction from the open axial end (flange) toward its bottom wall, so that the first casing member 28, where it is formed by aluminum die casting, can be removed from a die casting mold in the direction perpendicular to the above-indicated butting surface (namely, in the axial direction as seen in FIG. 1). Accordingly, there is a relatively high degree of freedom of arrangement of ribs formed to reinforce the first casing member 28, so that the first casing member 28 can be reinforced by a relatively small number of the ribs.

The present embodiment described above is configured such that the meshing reaction force generated on the counter shaft 36 is transmitted to the second casing member 30 and the third casing member 32, so that the first casing member 28 to which the stator 16s of the electric motor 16 is fixed is substantially protected from an influence of the meshing reaction force. Accordingly, the amount of variation of fixing position of the stator 16s of the electric motor 16 due to the meshing reaction force can be reduced, so that the operating noise of the electric motor 16 due to a variation of its air gap can be reduced. Further, it is not necessary to increase the amount of the air gap for avoiding the sliding contact of the stator 16s and rotor 16r of the electric motor 16 with each other, so that the operation performance of the electric motor 16 will not be reduced due to the otherwise increased amount of the air gap. In addition, the second casing member 30 functions as not only the support member supporting the counter shaft 36, but also the member forming the space 49 accommodating the electric motor 16, eliminating a need of providing a member which is exclusively used to form the space accommodating the electric motor 16.

Other embodiments of this invention will be described. In the embodiments described below, the same reference signs as used in the preceding embodiment will be used to identify the same portions, which will not be described redundantly.

Second Embodiment

Figure 2:
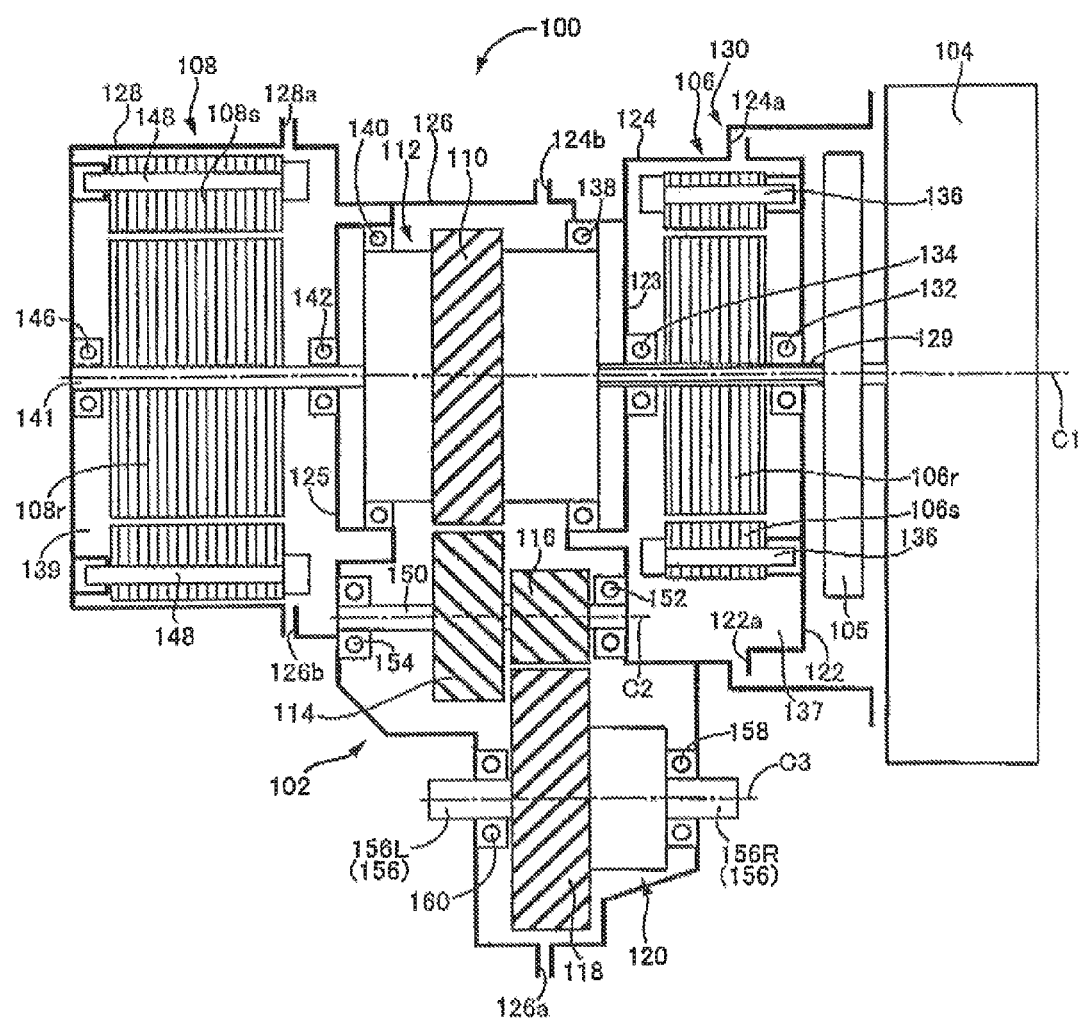
FIG. 2 is a schematic view for explaining an arrangement of a vehicular drive system according to another embodiment of the invention.

FIG. 2 is the schematic view for explaining an arrangement of a vehicular drive system 100 according to another embodiment of the invention. The vehicular drive system 100 is provided with major components accommodated in a casing 102, which include: an internal combustion engine in the form of an engine 104, a damper device 105, a first electric motor 106, a second electric motor 108 and a power distributing mechanism 112, which is known, which are disposed on a first axis C1; a counter driven gear 114 and a final drive gear 116 disposed on a second axis C2; and a differential mechanism 120 which is disposed on a third axis C3, to receive an input rotary motion from a final driven gear 118. The power distributing mechanism 112 is operatively connected to the first electric motor 106 and the second electric motor 108, and is provided with a counter drive gear 110 having radially outer or external teeth functioning as an output gear. It is noted that the counter driven gear 114 and the final drive gear 116 correspond to a helical gear portion provided according to the present invention, while the first and second electric motors 106, 108 correspond to electric motors provided according to the invention.

The casing 102 is constituted by four casing members consisting of a cylindrical first casing member 122 having a bottom wall, a cylindrical second casing member 124 having a partition wall 123, a cylindrical third casing member 126 having a partition wall 125, and a cylindrical fourth casing member 128 having a bottom wall. The second casing member 124 has an axially intermediate large-diameter portion 130 extending in its radial direction. The first casing member 122 and the second casing member 124 are fixed to each other with bolts not shown, such that a butting surface 122a of the first casing member 122 located at its open axial end and a butting surface 124a of the large-diameter portion 130 are held in tight contact with each other. The second casing member 124 and the third casing member 126 are fixed to each other with bolts not shown, such that a butting surface 124b of the second casing member 124 located at its axial end adjacent to the third casing member 126 and a butting surface 126a of the third casing member 126 located at its axial end adjacent to the second casing member 124 are held in tight contact with each other. The third casing member 126 and the fourth casing member 128 are fixed to each other with bolts not shown, such that a butting surface 126b of the third casing member 126 located at its axial end adjacent to the fourth casing member 128 and a butting surface 128a of the fourth casing member 128 located at its open axial end are held in tight contact with each other. It is noted that the first and fourth casing members 122 and 128 correspond to a first casing member provided according to the invention, while the second and third casing members 124 and 126 correspond to a second casing member provided according to the invention.

A cylindrical first rotor shaft 129 is disposed on the first axis C1, and a rotor 106*r* of the first electric motor 106 is fixedly mounted on this first rotor shaft 129 such that the rotor 106*r* is rotatably supported at one of its axial end portions by the first casing member 122 via a bearing 132, and at the other axial end portion by the second casing member 124 (partition wall 123) via a bearing 134. On the other hand, a stator 106*s* of the first electric motor 106 is fixed to the first casing member 122 with bolts 136.

The first electric motor 106 is accommodated within a space 137 formed by the first and second casing members 122 and 124 fixed to each other. The rotor 106*r* of this first electric motor 106 is rotatably supported at its opposite axial end portions by the respective first and second casing members 122 and 124. On the other hand, the second electric motor 108 is accommodated within a space 139 formed by the third and fourth casing members 126 and 128 fixed to each other. A rotor 108*r* of this second electric motor 108 is rotatably supported at its opposite axial end portions by the respective third and fourth casing members 126 and 128. Namely, the second and third casing members 124 and 126, each of which also functions as a motor cover which rotatably supports the rotor 106*r*, 108*r* of the corresponding electric motor 106, 108 at its one axial end portion.

The power distributing mechanism 112 disposed on the first axis C1 is rotatably supported at one of its opposite axial end portions by the second casing member 124 via a bearing 138, and at the other axial end portion by the third casing member 126 via a bearing 140. This power distributing mechanism 112 is constituted by a known planetary gear set, which has a sun gear connected to the first electric motor 106, a carrier connected to the engine 104 through the damper device 105, and a ring gear corresponding to the counter drive gear 110, which is connected to the second electric motor 108 and which is held in meshing engagement with the counter driven gear 114. The counter drive gear 110 corresponds to an output member (output shaft or drive shaft) of the power distributing mechanism 112. Thus, the second electric motor 108 is connected directly to the output member of the power distributing mechanism 112, or through a speed reducing mechanism.

A second rotor shaft 141 is disposed on the first axis C1, and the rotor 108*r* of the second electric motor 108 is fixedly mounted on this second rotor shaft 141 such that the rotor 108*r* is rotatably supported at one of its axial end portions by the third casing member 126 (partition wall 125) via a bearing 142, and at the other axial end portion by the fourth casing member 128 via a bearing 146. On the other hand, a stator 108*s* of the second electric motor 108 is fixed to the fourth casing member 128 with bolts 148.

A counter shaft 150 is disposed on the second axis C2 such that the counter shaft 150 is rotatably supported at one of its opposite axial end portions by the second casing member 124 (partition wall 123) via a bearing 152, and at the other axial end portion by the third casing member 126 via a bearing 154. On the counter shaft 150, there are fixedly mounted the counter driven gear 114 meshing with the counter drive gear 110, and the final drive gear 116 meshing with the final driven gear 118. It is noted that the counter shaft 150, bearing 152 and bearing 154 constitute a support portion which is provided according to the present invention to support the helical gear portion.

The differential mechanism 120 which receives an input rotary motion from the final driven gear 118 is disposed on the third axis C3, and a pair of drive shafts 156 (156L and 156R) which are output shafts of the differential mechanism 120 are supported rotatably about the third axis C3. The drive shaft 156R is rotatably supported by the second casing member 124 via a bearing 158, while the drive shaft 156L is rotatably supported by the third casing member 126 via a bearing 160.

In this embodiment, the counter drive gear 110, counter driven gear 114, final drive gear 116 and final driven gear 118 are all constituted by helical gears, so that meshing engagements of these helical gears generate meshing reaction forces at the meshing portions, which are transmitted to the counter shaft 150, and to the second casing member 124 through the bearing 152 and to the third casing member 126 via the bearing 154. On the other hand, the first and fourth casing members 122 and 128 are fixed to the respective second and third casing members 124, 126 with bolts not shown, at their butting surfaces provided in their portions which take the form of flanges having higher degrees of rigidity, so that local displacements (deformations) of the second and third casing members 124, 126 due to the meshing reaction forces are not substantially transmitted to the first and fourth casing members 122, 128 via the butting surfaces.

In the present embodiment, the stator 106*s* of the first electric motor 106 is fixed to the first casing member 122, while the stator 108*s* of the second electric motor 108 is fixed to the fourth casing member 128, so that local displacements of the second and third casing members 124 and 126 due to the meshing reaction forces are not substantially transmitted to the first and fourth casing members 122 and 128 via the butting surfaces, and fixing positions of the stators of the first and second electric motors 106 and 108 are kept substantially unchanged due to the meshing reaction forces, whereby amounts of variation of air gaps of the first and second electric motors 106, 108 are reduced, so that operating noises of the first and second electric motors 106, 108 due to the variation of their air gaps are reduced.

Further, the first casing member 122 to which the stator 106*s* of the first electric motor 106 is fixed has an outside diameter which decreases in the axial direction from its open axial end toward its bottom wall, so that the first casing member 122, where it is formed by aluminum die casting, can be removed from a die casting mold in the direction perpendicular to a butting surface 122*a*. Accordingly, there is a relatively high degree of freedom of arrangement of ribs formed to reinforce the first casing member 122, so that the first casing member 122 can be reinforced by a relatively small number of the ribs.

Similarly, the fourth casing member 128 to which the stator 108*s* of the second electric motor 108 is fixed has an outside diameter which decreases in the axial direction from its open axial end toward its bottom wall, so that the fourth casing member 128, where it is formed by aluminum die casting, can be removed from a die casting mold in the direction perpendicular to a butting surface 128*a*. Accordingly, there is a relatively high degree of freedom of arrangement of ribs formed to reinforce the fourth casing member 128, so that the fourth casing member 128 can be reinforced by a relatively small number of the ribs.

The vehicular drive system 100 according to the present embodiment described above has substantially the same advantages as the vehicular drive system 10 according to the preceding embodiment. Further, the second casing member 124 functions as not only the support member supporting the counter shaft 150, but also the member forming the space 137 accommodating the first electric motor 106, eliminating a need of providing a member which is exclusively used to form the space 137 accommodating the first electric motor 106. Similarly, the third casing member 126 functions as not only the support member supporting the counter shaft 150, but also the member forming the space 139 accommodating the second electric motor 108, eliminating a need of providing a member which is exclusively used to form the space 139 accommodating the second electric motor 108.

Third Embodiment

Figure 3:
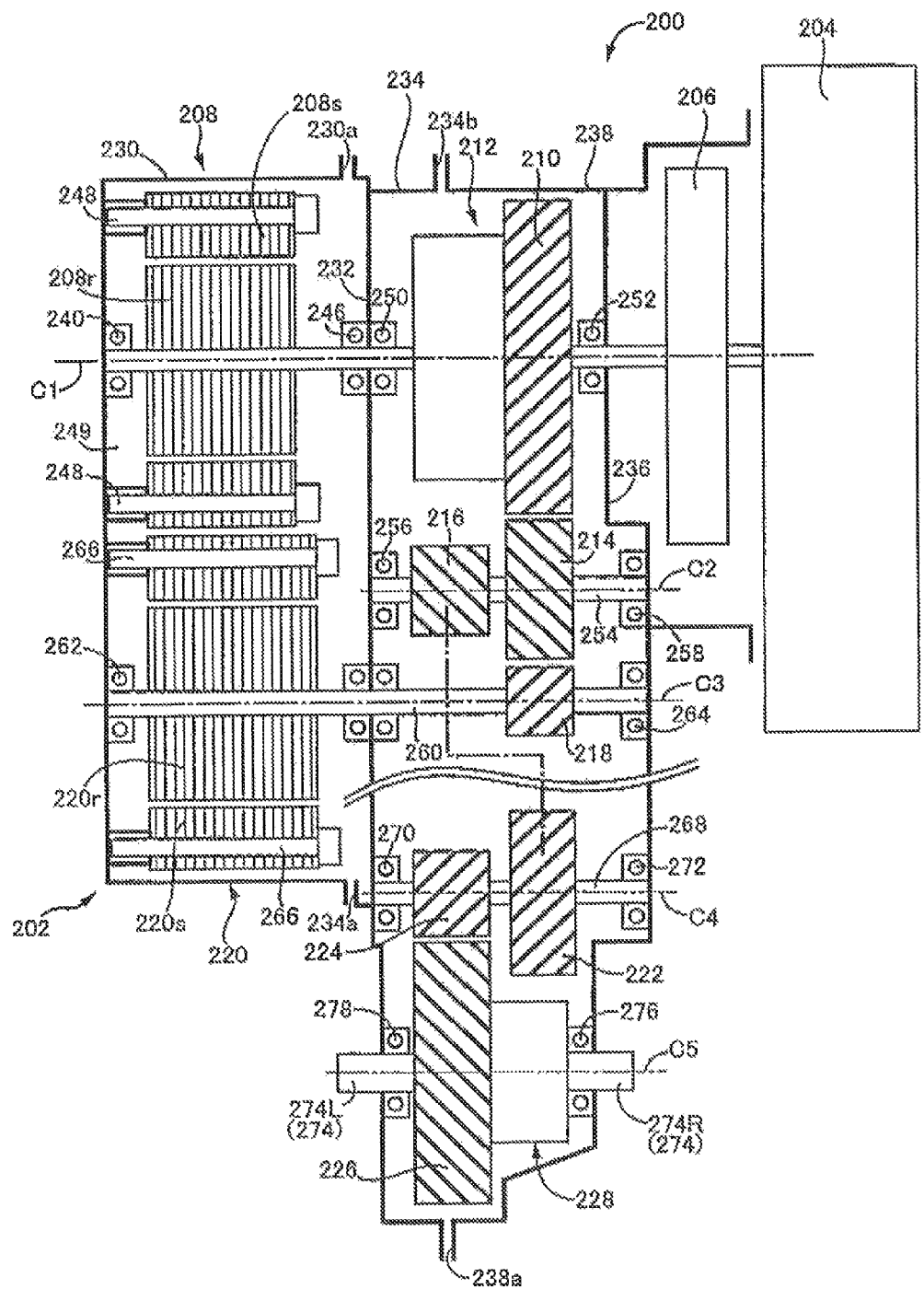
FIG. 3 is a schematic view for explaining an arrangement of a vehicular drive system according to a further embodiment of the invention.

FIG. 3 is the schematic view for explaining an arrangement of a vehicular drive system 200 according to a further embodiment of the invention. The vehicular drive system 200 is provided with major components accommodated in a casing 202, which include: an internal combustion engine in the form of an engine 204, a damper device 206, a first electric motor 208, and a known power distributing mechanism 212 which are disposed on a first axis C1; a counter driven gear 214 and a first speed reducing gear 216 which are disposed on a second axis C2; a second counter drive gear 218 and a second electric motor 220 which are disposed on a third axis C3; a second speed reducing gear 222 and a final drive gear 224 which are disposed on a fourth axis C4; and a differential mechanism 228 which is disposed on a fifth axis C5, to receive an input rotary motion from a final driven gear 226. The power distributing mechanism 212 is operatively connected to the engine 204 and the first electric motor 208, and is provided with a first counter drive gear 210 having radially outer or external teeth functioning as an output gear. It is noted that the counter driven gear 214, first speed reducing gear 216, second speed reducing gear 222 and final drive gear 224 correspond to a helical gear portion provided according to the present invention, while the first and second electric motors 208, 220 correspond to electric motors provided according to the invention.

The casing 202 is constituted by three casing members consisting of a cylindrical first casing member 230 having a bottom wall, a second casing member 234 having a partition wall 232, and a third casing member 238 having a partition wall 236. The first casing member 230 and the second casing member 234 are fixed to each other with bolts not shown, such that a butting surface 230*a* of the first casing member 230 located at its open axial end and a butting surface 234*a* of the second casing member 234 located at its axial end located adjacent to the first casing member 230 are held in tight contact with each other. The second casing member 234 and the third casing member 238 are fixed to each other with bolts not shown, such that a butting surface 234*b* of the second casing member 234 located at its axial end located adjacent to the third casing member 238 and a butting surface 238*a* of the third casing member 238 located at its axial end adjacent to the second casing member 234 are held in tight contact with each other. It is noted that, in this embodiment, the first casing member 230 corresponds to a first casing member provided according to the invention, while the second and third casing members 234 and 238 correspond to a second casing member provided according to the invention.

In the present embodiment, the first electric motor 208 and the second electric motor 220 are disposed on the respective different axes such that the first and second electric motors 208, 220 overlap each other as seen in the radial direction, so that the vehicular drive system 200 has a relatively small axial dimension.

A rotor shaft 239 is disposed on the first axis C1, and a rotor 208*r* of the first electric motor 208 is fixedly mounted on this rotor shaft 239 such that the rotor 208*r* is rotatably supported at one of its axial end portions by the first casing member 230 via a bearing 240, and at the other axial end portion by the second casing member 234 (partition wall 232) via a bearing 246. On the other hand, a stator 208*s* of the first electric motor 208 is fixed to the first casing member 230 with bolts 248.

The first electric motor 208 and the second electric motor 220 are accommodated within a space 249 formed by the first and second casing members 230 and 234 fixed to each other. The rotor 208*r* of the first electric motor 208 is rotatably supported at its opposite axial end portions by the respective first and second casing members 230 and 234. Namely, the second casing member 234 also functions as a motor cover which rotatably supports the rotor 208*r* of the first electric motor 208 and a rotor 220*r* of the second electric motor 220 at their one axial end portion.

The power distributing mechanism 212 disposed on the first axis C1 is rotatably supported at one of its opposite axial end portions by the second casing member 234 (partition wall 232) via a bearing 250, and at the other axial end portion by the third casing member 238 (partition wall 236) via a bearing 252. Since the power distributing mechanism 212 is identical in basic construction with the power distributing mechanism 112 in the preceding embodiment, no further description of the details of the construction of the power distributing mechanism 212 will be provided.

A first counter shaft 254 is disposed on the second axis C2 such that the first counter shaft 254 is rotatably supported at one of its opposite axial end portions by the second casing member 234 (partition wall 232) via a bearing 256, and at the other axial end portion by the third casing member 238 (partition wall 236) via a bearing 258. On this first counter shaft 254, there are fixedly mounted the first counter driven gear 214 meshing with the first counter drive gear 210 and the second counter drive gear 218, and the first speed reducing gear 216 meshing with the second speed reducing gear 222. Although FIG. 3 shows that the first and second speed reducing gears 216 and 222 are spaced apart from each other in the axial direction, these speed reducing gears 216, 222 are actually located at the same axial position and are held in meshing engagement with each other. Namely, FIG. 3 is the development view for the sake of showing all of the axes in one plane, so that the first and second speed reducing gears 216, 222 are shown so as to be axially spaced apart from each other. It is noted that the first counter shaft 254, bearing 256 and bearing 258 constitute a support portion which is provided according to the present invention to support the helical gear portion.

A power transmitting shaft 260 is disposed on the third axis C3 such that the power transmitting shaft 260 is rotatably supported at one of its opposite axial end portions by the first casing member 230 via a bearing 262, and at the other axial end portion by the third casing member 238 (partition wall 236) via a bearing 264. On this power transmitting shaft 260, there are fixedly mounted the second electric motor 220 and the second counter drive gear 218. Described more specifically, the rotor 220*r* of the second electric motor 220 is fixed on the power transmitting shaft 260, while the stator 220*s* of the second electric motor 220 is fixed to the first casing member 230 with bolts 266. Further, the second counter drive gear 218 meshing with the counter driven gear 214 is fixed on the power transmitting shaft 260. Accordingly, a drive force of the second electric motor 220 is transmitted to the counter driven gear 214 through the second counter drive gear 218.

A second counter shaft 268 is disposed on the fourth axis C4 such that the second counter shaft 268 is rotatably supported at one of its opposite axial end portions by the second casing member 234 (partition wall 232) via a bearing 270, and at the other axial end portion by the third casing member 238 (partition wall 236) via a bearing 272. On this second counter shaft 268, there are fixedly mounted the second speed reducing gear 222 meshing with the first speed reducing gear 216, and the final drive gear 224 meshing with the final driven gear 226. It is noted that the second counter shaft 268, bearing 270 and bearing 272 constitute a support portion which is provided according to the present invention to support the helical gear portion.

The differential mechanism 228 which receives an input rotary motion from the final driven gear 226 is disposed on the fifth axis C5, and a pair of drive shafts 274 (274L and 274R) which are output shafts of the differential mechanism 228 are supported rotatably about the fifth axis C5. The drive shaft 274R is rotatably supported by the third casing member 238 via a bearing 276, while the drive shaft 274L is rotatably supported by the second casing member 234 via a bearing 278.

In this embodiment the first counter drive gear 210, counter driven gear 214, first speed reducing gear 216, second counter drive gear 218, second speed reducing gear 222, final drive gear 224 and final driven gear 226 are all constituted by helical gears, so that meshing engagements of these helical gears generate meshing reaction forces at the meshing portions, which are transmitted to the first counter shaft 254, and to the second casing member 234 through the bearing 256 and to the third casing member 238 via the bearing 258. Further, the meshing reaction forces generated at the meshing portions and transmitted to the second counter shaft 268 are transmitted to the second casing member 234 through the bearing 270, and to the third casing member 238 through the bearing 272. On the other hand, the first casing member 230 is fixed to the second casing member 234 with bolts not shown, at their butting surfaces provided in their portions which take the form of flanges having higher degrees of rigidity, so that local displacement of the second casing member 234 due to the meshing reaction forces is not substantially transmitted to the first casing member 230 via the butting surfaces.

In the present embodiment, the stator 208s of the first electric motor 208 is fixed to the first casing member 230, while the stator 220s of the second electric motor 220 is fixed to the first casing member 230, so that local displacement of the second casing member 234 due to the meshing reaction forces is not substantially transmitted to the first casing member 230 via the butting surfaces and the local displacement (deformation) due to the meshing reaction forces is hardly transmitted to the first casing member 230, fixing positions of the stators 208s of the first electric motor 208 and the stator 220s of the second electric motor 220 are kept substantially unchanged due to the meshing reaction forces, whereby amounts of variation of air gaps of the first and second electric motors 208, 220 are reduced, so that operating noises of the first and second electric motors 208, 220 due to the variation of their air gaps are reduced.

Further, the first casing member 230 to which the stator 208s of the first electric motor 208 and the stator 220s of the second electric motor 220 are fixed has an outside diameter which decreases in the axial direction from its open axial end toward its bottom wall, so that the first casing member 230, where it is formed by aluminum die casting, can be removed from a die casting mold in the direction perpendicular to the butting surface 230a. Accordingly, there is a relatively high degree of freedom of arrangement of ribs formed to reinforce the first casing member 230, so that the first casing member 230 can be reinforced by a relatively small number of the ribs.

The vehicular drive system 200 according to the present embodiment described above has substantially the same advantages as the vehicular drive system 10 according to the preceding embodiment. In addition, the second casing member 234 functions as not only the support member supporting the first counter shaft 254 and the second counter shaft 268, but also the member forming the space 249 accommodating the first and second electric motors 208 and 220, eliminating a need of providing a member which is exclusively used to form the space 249 accommodating the first and second electric motors 208, 220.

Fourth Embodiment

Figure 4:
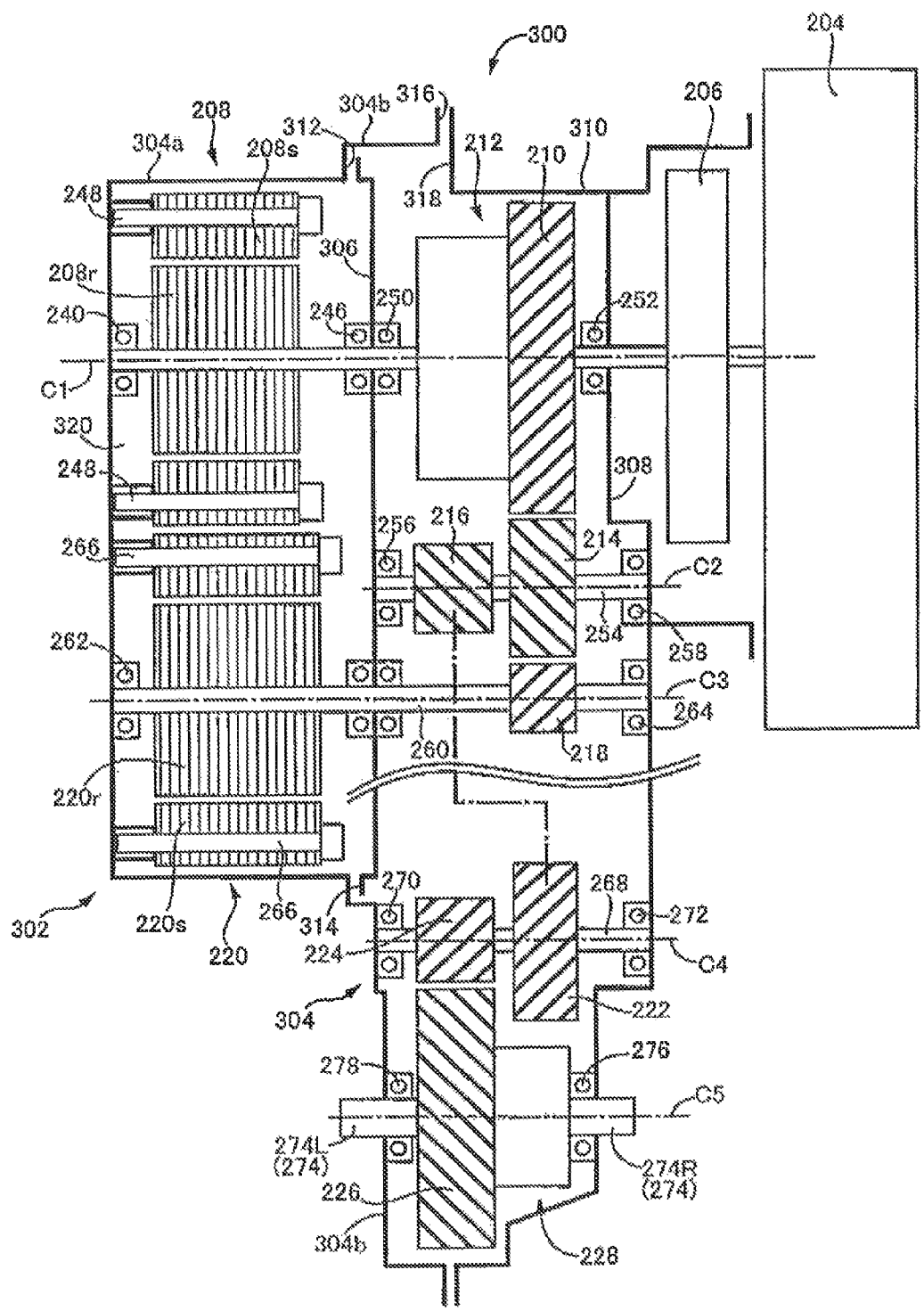
FIG. 4 is a schematic view for explaining an arrangement of a vehicular drive system according to a still further embodiment of the invention.

FIG. 4 is the schematic view for explaining an arrangement of a vehicular drive system 300 according to a still further embodiment of the invention. The vehicular drive system 300 of FIG. 4 is different in construction from the vehicular drive system 200 of FIG. 3, with respect to only the structure of the casing, and is identical with the vehicular drive system 200 in the other aspects. Therefore, the same reference signs as used for the vehicular drive system 200 will be used for the vehicular drive system 300, to identify the same elements, and only the casing of the vehicular drive system 300 which is different from that of the vehicular drive system 200 will be described.

A casing 302 of the vehicular drive system 300 is constituted by three casing members consisting of a cylindrical first casing member 304 having a bottom wall, a second casing member 306 in the form of a disc, and a third casing member 310 having a partition wall 308. The first casing member 304 consists of a first cylindrical portion 304a having a bottom wall, and a second cylindrical portion 304b which is partially formed so as to axially extend from the open axial end of the first cylindrical portion 304a and which has a larger diameter than the first cylindrical portion 304a. The first and second cylindrical portions 304a and 304b have a butting surface 312 at a position of their joint, while a motor cover 306 has a butting surface 314 on a radially extending flange formed at one of its opposite axial ends. The first casing member 304 and the motor cover 306 are fixed to each other with bolts not shown, such that the butting surfaces 312 and 314 are held in tight contact with each other. The second cylindrical portion 304b of the first casing member 304 has another butting surface 316 on a radially extending flange formed at one of its opposite axial ends, while the third casing member 310 has a butting surface 318 at one of its opposite axial ends on the side of the second casing member 306. The first casing member 304 and the third casing member 310 are fixed to each other with bolts not shown, such that the butting surfaces 316 and 318 are held in tight contact with each other.

In the present embodiment, the stator 208s of the first electric motor 208 is fixed to the first casing member 304 (first cylindrical portion 304a) with bolts 248, while the stator 220s of the second electric motor 220 is fixed to the first casing member 304 (first cylindrical portion 304a) with bolts 266. The first counter shaft 254 is rotatably supported at its one axial end portion by the second casing member 306 via the bearing 256, and at its other axial end portion by the third casing member 310 (partition wall 308) via the bearing 258. The second counter shaft 268 is rotatably supported at its one axial end portion by the second casing member 306 via the bearing 270, and at its other axial end portion by the third casing member 310 via the bearing 272.

The first electric motor 208 and the second electric motor 220 are accommodated within a space 320 formed by the first and second casing members 304 and 306 fixed to each other. The rotor 208r of this first electric motor 208 is rotatably supported at its opposite axial end portions by the respective first and second casing members 304 and 306. Namely, the second casing member 306 also functions as a motor cover which rotatably supports the rotor 208r of the first electric motor 208 and the rotor 220r of the second electric motor 220 at its one axial end portion.

The meshing reaction forces generated by the meshing engagements of the helical gears and transmitted to the first counter shaft 254 and the second counter shaft 268 are transmitted to the second and third casing members 306 and 310. On the other hand, the first casing member 304 is fixed to the second and third casing members 306, 310 with bolts not shown, at their butting surfaces provided in their portions which take the form of flanges having higher degrees of rigidity, so that local displacements of the second and third casing members 306, 310 due to the meshing reaction forces are not substantially transmitted to the first casing member 304 via the butting surfaces. Accordingly, the amounts of displacement of the stator 208s of the first electric motor 208 and the stator 220s of the second electric motor 220 are reduced by the meshing reaction forces, so that the amounts of variation of air gaps of the first and second electric motors 208, 220 are reduced, whereby the operating noises of the first and second electric motors 208, 220 due to the variation of their air gaps are reduced.

Further, the first casing member 304 to which the stator 208s of the first electric motor 208 and the stator 220s of the second electric motor 220 are fixed has an outside diameter which decreases in the axial direction from its open axial end toward its bottom wall, so that the first casing member 304, where it is formed by aluminum die casting, can be removed from a die casting mold in the direction perpendicular to the butting surface 316. Accordingly, there is a relatively high degree of freedom of arrangement of ribs formed to reinforce the first casing member 304, so that the first casing member 304 can be reinforced by a relatively small number of the ribs.

The vehicular drive system 300 according to the present embodiment described above has substantially the same advantages as the vehicular drive systems 10, etc. according to the preceding embodiments. In addition, the second casing member 306 functions as not only the support member supporting the first counter shaft 254, but also the member forming the space 320 accommodating the first and second electric motors 208 and 220, eliminating a need of providing a member which is exclusively used to form the space 320 accommodating the first and second electric motors 208, 220.

Fifth Embodiment

Figure 5:
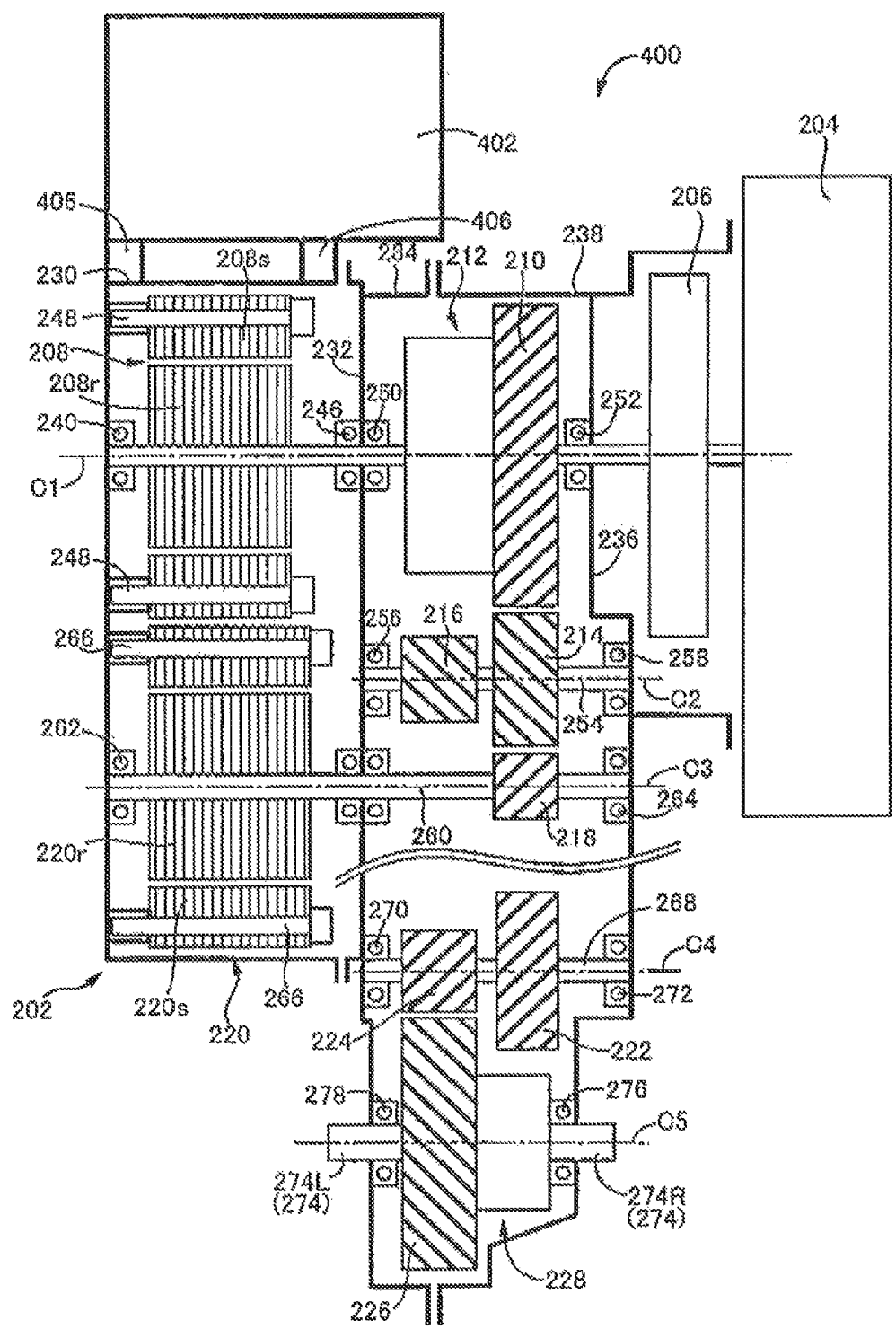
FIG. 5 is a schematic view for explaining an arrangement of a vehicular drive system according to a yet further embodiment of the invention.

FIG. 5 is the schematic view for explaining an arrangement of a vehicular drive system 400 according to a yet further embodiment of the invention. The vehicular drive system 400 is provided with an inverter 402 (motor control unit) installed outside of the casing of the vehicular drive system 200 of FIG. 3 described above. Since the vehicular drive system 400 is identical in construction with the vehicular drive system 200 in the other aspects, the same reference signs as used for the vehicular drive system 200 will be used for the vehicular drive system 400, to identify the same elements, and only a retaining structure for the inverter 402 will be described.

The first casing member 230 is provided with an inverter fixing portion 406 for fixing the inverter 402. The inverter 402 is fixed to the inverter fixing portion 406 with bolts not shown. Since the inverter 402 is thus fixed to the first casing member 230, the meshing reaction forces generated on the first counter shaft 254 are transmitted to the second casing member 234 and the third casing member 238 through the bearings 256 and 258, but are not substantially transmitted to the first casing member 230. Further, the meshing reaction forces generated on the second counter shaft 268 are transmitted to the second and third casing members 234, 238 via the bearings 270 and 272, but are not substantially transmitted to the first casing member 230. Accordingly, it is possible to reduce an amount of vibrations derived from the meshing reaction forces which is transmitted to the inverter 402.

The vehicular drive system 400 according to the present embodiment described above has substantially the same advantages as the vehicular drive systems 10, etc. In addition, the inverter 402 is fixed to the casing member other than the second casing member 234, more specifically, fixed to the first casing member 230, so that it is possible to reduce the amount of the vibrations derived from the meshing reaction forces, which amount is transmitted to the inverter 402.

Sixth Embodiment

Figure 6:
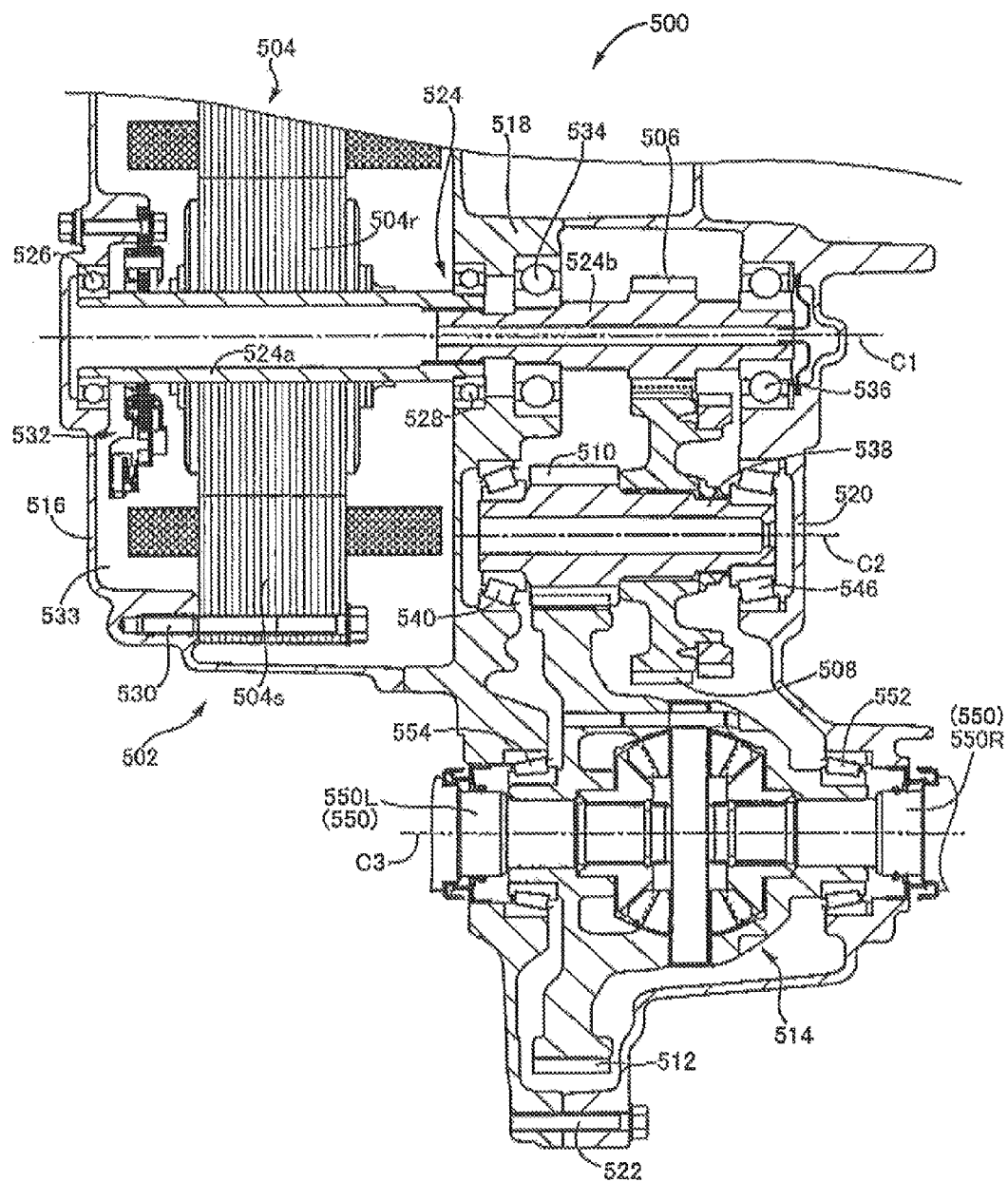
FIG. 6 is a schematic view for explaining an arrangement of a vehicular drive system according to still another embodiment of the invention.

FIG. 6 is the schematic view for explaining an arrangement of a vehicular drive system 500 according to still another embodiment of the invention. The vehicular drive system 500 is different from the vehicular drive system 10 of FIG. 1, with respect to only the positions of the electric motor, and is identical in basic construction with the vehicular drive system 10 with respect to the power transmitting mechanism.

The vehicular drive system 500 is provided with major components accommodated in a casing 502, which include: an electric motor 504 and a counter drive gear 506 disposed on a first axis C1; a counter driven gear 508 and a final drive gear 510 disposed on a second axis C2; and a differential mechanism 514 which is disposed on a third axis C3, to receive an input rotary motion from a final driven gear 512.

The casing 502 is constituted by three casing members consisting of a cylindrical first casing member 516 having a bottom wall, a second casing member 518 in the form of a disc, and a cylindrical third casing member 520 having a bottom wall. As shown in FIG. 6, the second casing member 518 and the third casing member 520 are fixed to each other with bolts 522, with their butting surfaces being held in tight contact with each other. The first casing member 516 and the second casing member 518 are also fixed to each other with bolts not shown, with their mutually adjacent butting surfaces being held in tight contact with each other, though this fixing of the first and second casing members 516, 518 is not shown in FIG. 6.

The vehicular drive system 500 is provided with an input shaft 524 which is rotatable about the axis C1. The input shaft 524 consists of a first input shaft 524a and a second input shaft 524b, which are disposed in series with each other on the axis C1. The first and second input shafts 524a and 524b are splined to each other in their connecting end portions, whereby the first and second input shafts 524a, 524b are not rotatable relative to each other.

The first input shaft 524a is rotatably supported at its one axial end portion by the first casing member 516 via a bearing 526, and at its other axial end portion by the second casing member 518 via a bearing 528. To this first input shaft 524a, there is fixed a rotor 504r of the electric motor 504. A stator 504s of the electric motor 504 is fixed to the first casing member 516 with bolts 530. Between the electric motor 504 and the bearing 526, there is disposed a resolver 532 for detecting a rotating speed of the rotor 504r of the electric motor 504.

The electric motor 504 is accommodated within a space 533 formed by the first and second casing members 516 and 518 fixed to each other. The first input shaft 524a to which the rotor 504r of this electric motor 504 is fixed is rotatably supported at its opposite axial end portions by the respective first and second casing members 516 and 518. Namely, the second casing member 518 also functions as a motor cover which rotatably supports the rotor 504r of the electric motor 504 at its one axial end portion.

The second input shaft 524b is rotatably supported at its one axial end portion by the second casing member 518 via a bearing 534, and at its other axial end portion by the third casing member 520 via a bearing 536. To this second input shaft 524b, there is fixed the counter drive gear 506. Accordingly, a drive force of the electric motor 504 is transmitted from the counter drive gear 506.

The vehicular drive system 500 is provided with a counter shaft 538 rotatable about the axis C2. The counter shaft 538 is rotatably supported at its one axial end portion by the second casing member 518 via a bearing 540, and at its other axial end portion by the third casing member 520 via a bearing 546. The final drive gear 510 is formed integrally with the counter shaft 538. The counter driven gear 508 is splined to the counter shaft 538, so that the counter driven gear 508 and the counter shaft 538 are rotated as a unit.

The vehicular drive system 500 is provided with the differential mechanism 514 disposed on the axis C3 to receive the input rotary motion from the final driven gear 512. When the differential mechanism 514 receives the rotary motion from the final driven gear 512, the differential mechanism 514 drives left and right drive wheels 550 (550L and 550R) while permitting a difference between their rotating speeds according to a running state of the vehicle. The drive wheel 550R is rotatably supported by the third casing member 520 via a bearing 552, while the drive wheel 550L is rotatably supported by the second casing member 518 via a bearing 554.

In the present embodiment, the counter drive gear 506, counter driven gear 508, final drive gear 510 and final driven gear 512 are all constituted by helical gears, so that upon transmission of a drive force from the electric motor 504 to the helical gears, for example, meshing reaction forces are generated between the counter drive gear 506 and the counter driven gear 508, and between the final drive gear 510 and the final driven gear 512. These meshing reaction forces are transmitted to the counter shaft 538, and transmitted from the counter shaft 538 to the second casing member 518 and the third casing member 520 through the bearing 540 and the bearing 546. On the other hand, the first casing member 516 is fixed to the second casing member 518 with bolts not shown. In this respect, it is noted that the portions of the first and second casing members 516, 518 provided with the butting surfaces take the form of flanges having higher degrees of rigidity, so that a local displacement (deformation) of the second casing member 518 due to the meshing reaction force is not substantially transmitted to the first casing member 516 via the butting surfaces, whereby the first casing member 516 is not substantially deformed due to the meshing reaction force, and fixing position of the stator of the electric motor 504 is held substantially unchanged. Accordingly, an operating noise of the electric motor 504 due to a variation of its air gap is reduced. Further, it is not necessary to increase the amount of the air gap between the stator 504s and rotor 504r of the electric motor 504, so that an amount of reduction of an operating performance of the electric motor 504 due to the otherwise increased amount of the air gap is reduced.

The vehicular drive system 500 according to the present embodiment described above has substantially the same advantages as the vehicular drive systems 10, etc.

While the embodiments of this invention have been described in detail by reference to the drawings, it is to be understood that the invention may be otherwise embodied.

For example, the embodiments have been described for illustrative purpose only, and it is to be understood that the construction of the vehicular drive system is not limited to the details of the illustrated embodiments, and that the present invention is equally applicable to any vehicular drive system which has a casing consisting of a plurality of casing members and at least one electric motor and a helical gear portion.

It is to be understood that the foregoing description is provided for illustrative purpose only, and that the present invention may be embodied with various other changes and improvements, which may occur to those skilled in the art.

NOMENCLATURE OF REFERENCE SIGNS 10, 100, 200, 300, 400, 500: Vehicular drive system
12, 102, 202, 302, 502: Casing
16, 504: Electric motor
16r, 106r, 108r, 208r, 220r, 504r: Rotor
16s, 106s, 108s, 208s, 220s, 504s: Stator
20, 114, 214, 508: Counter driven gear (Helical gear portion)
22, 116, 510: Final drive gear (Helical gear portion)
28, 122, 230, 304, 516: First casing member
30, 124, 234, 306, 518: Second casing member
32, 126, 238, 310, 520: Third casing member (Second casing member)
128: Fourth casing member (First casing member)
36, 150, 538: Counter shaft (Support portion of helical gear portion)
49, 137, 139, 249, 320, 533: Space
50, 52, 152, 154, 256, 258, 270, 272, 540, 546: Bearing (Support portion of helical gear portion)
106, 208: First electric motor (Electric motor)
108, 220: Second electric motor (Electric motor)
216: First speed reducing gear (Helical gear portion)
254: First counter shaft (Support portion of helical gear portion)
268: Second counter shaft (Support portion of helical gear portion)
402: Inverter

The invention claimed is:

1. A vehicular drive system which is provided with at least one electric motor and a helical gear portion which are accommodated within a casing formed by a plurality of casing members fixed to each other, wherein:
said casing includes a first casing member to which a stator of each of said at least one electric motor is fixed, and a second casing member which is fixed to said first casing member so as to cooperate with said first casing member to form a space accommodating said at least one electric motor and which has a support portion supporting said helical gear portion;
a rotor of said each electric motor is provided on a first shaft that is rotatably supported at supported portions thereof by said first casing member and said second casing member, respectively, said supported portions of said first shaft being located on axially opposite sides of said rotor,
said helical gear portion consists of a plurality of helical gears, each of said plurality of helical gears being rotatably supported at both axially opposite sides thereof by said second casing member through said support portion, and
said stator is fixed to said first casing member by a fastener member that is engaged with said first casing member, wherein
said rotor of said each electric motor is supported at one of said opposite ends thereof by said first casing member via a first bearing provided in said first casing member and at the other of said opposite ends thereof by said second casing member via a second bearing provided in said second casing member, and wherein
at least one of said helical gears is coaxial with said rotor, and is provided on a second shaft which is splined to said first shaft and which is rotatably supported at supported portions thereof by said second casing member through said support portion, said supported portions of said second shaft being located on axially opposite sides of said at least one of said helical gears; and wherein
said first and second shafts, which are splined to each other, are not rotatable relative to each other and are axially displaceable relative to each other.

2. The vehicular drive system according to claim 1, wherein:
said first casing member has an opening at an axial end thereof, and includes a flange portion, and
said first casing member is held in contact, at a surface provided by said flange portion, with said second casing member.

3. The vehicular drive system according to claim 1, wherein said supporting portion supporting said helical gear portion includes tapered roller bearings for sustaining meshing reaction forces generated in said helical gear portion.

4. The vehicular drive system according to claim 1, wherein said fastener member, by which said stator is fixed to said first casing member, is a screw, and
wherein said screw passes through a through-hole provided in said stator, and is in thread engagement with said first casing member.

5. The vehicular drive system according to claim 1, wherein said stator is held in contact with said first casing member by said fastener member that fixes said stator to said first casing member.

6. The vehicular drive system according to claim 1, wherein said first casing member has an opposed surface that is opposed to and distant from said second casing member, and
wherein said fastener member is engaged with said opposed surface of said first casing member such that said stator is fixed to said opposed surface by said fastener member.

7. The vehicular drive system according to claim 6, wherein said stator is held in contact with said opposed surface of said first casing member by said fastener member that fixes said stator to said opposed surface.

8. The vehicular drive system according to claim 1, wherein
said first casing member is a cylindrical member having a bottom wall, and
said rotor of said each electric motor is rotatably supported at one of said opposite ends thereof by said bottom wall of said first casing member.

9. The vehicular drive system according to claim 1, wherein
said plurality of helical gears are rotatably supported by said second casing member through said support portion, without any of said plurality of helical gears being supported by said first casing member.

10. The vehicular drive system according to claim 1, wherein
said first casing member is a cylindrical member having a bottom wall,
said rotor of said each electric motor is rotatably supported at one of said opposite ends thereof by said bottom wall of said first casing member,
said fastener member, by which said stator is fixed to said bottom wall of said first casing member, is a screw, and
said screw passes through a through-hole provided in said stator, and is in thread engagement with said bottom wall of said first casing member.

11. The vehicular drive system according to claim 1, wherein
said first casing member is a cylindrical member having a bottom wall,
said rotor of said each electric motor is rotatably supported at one of said opposite ends thereof by said bottom wall of said first casing member, and
said stator is held in contact with said bottom wall of said first casing member by said fastener member that fixes said stator to said bottom wall of said first casing member.

12. The vehicular drive system according to claim 1, wherein
said first casing member is a cylindrical member having a bottom wall,
said rotor of said each electric motor is rotatably supported at one of said opposite ends thereof by said bottom wall of said first casing member,
said bottom wall of said first casing member has an opposed surface that is opposed to and distant from said second casing member, and
said fastener member is engaged with said opposed surface of said bottom wall of said first casing member such that said stator is fixed to said opposed surface by said fastener member.

13. The vehicular drive system according to claim 12, wherein said stator is held in contact with said opposed surface of said bottom wall of said first casing member by said fastener member that fixes said stator to said opposed surface.

14. A vehicular drive system which is provided with at least one electric motor and a helical gear portion which are accommodated within a casing formed by a plurality of casing members fixed to each other, wherein:
said casing includes a first casing member to which a stator of each of said at least one electric motor is fixed, and a second casing member which is fixed to said first casing member so as to cooperate with said first casing member to form a space accommodating said at least one electric motor and which has a support portion supporting said helical gear portion;

a rotor of said each electric motor is provided on a first shaft that is rotatably supported at supported portions thereof by said first casing member and said second casing member, respectively, said supported portions of said first shaft being located on axially opposite sides of said rotor, said helical gear portion consists of a plurality of helical gears, each of said plurality of helical gears being rotatably supported at both axially opposite sides thereof by said second casing member through said support portion, and said stator is fixed to said first casing member by a fastener member that is engaged with said first casing member, wherein said rotor of said each electric motor is supported at one of said opposite ends thereof by said first casing member via a first bearing provided in said first casing member and at the other of said opposite ends thereof by said second casing member via a second bearing provided in said second casing member, and wherein at least one of said helical gears is coaxial with said rotor, and is provided on a second shaft which is splined to said first shaft and which is rotatably supported at supported portions thereof by said second casing member through said support portion, said supported portions of said second shaft being located on axially opposite sides of said at least one of said helical gears; and wherein said second shaft is rotatably supported at said supported portions thereof by said second casing member via third and fourth bearings which are parts of said support portion and which are provided in said second casing member, and said first shaft is rotatably supported at said supported portions thereof by said first and second casing members via said first and second bearings which are provided in said first and second casing members, respectively, and which are other than said third and fourth bearings.

\* \* \* \* \*